J. GODDARD.
REVOLVING BACK CAMERA.
APPLICATION FILED NOV. 29, 1910.
1,001,386.
Patented Aug. 22, 1911.
2 SHEETS—SHEET 1.
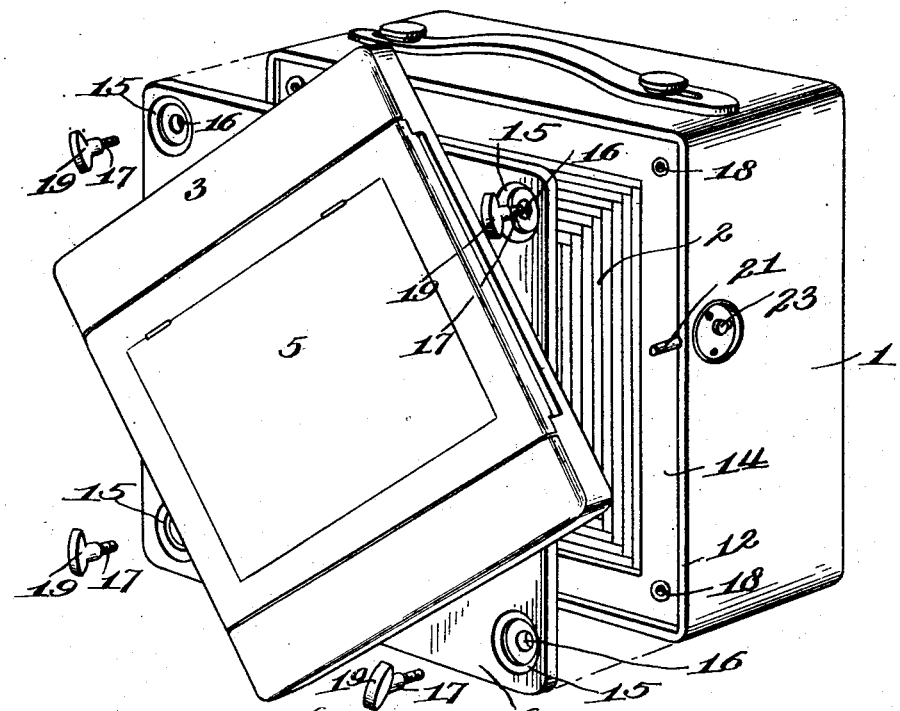
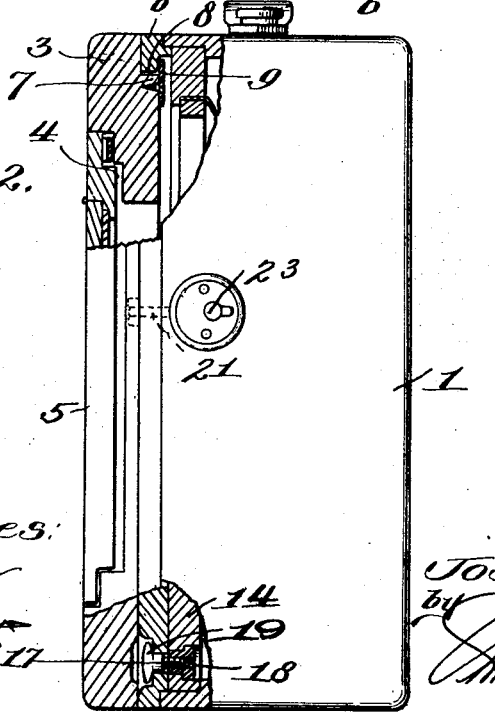
Witnesses:
Inventor
Joseph Goddard

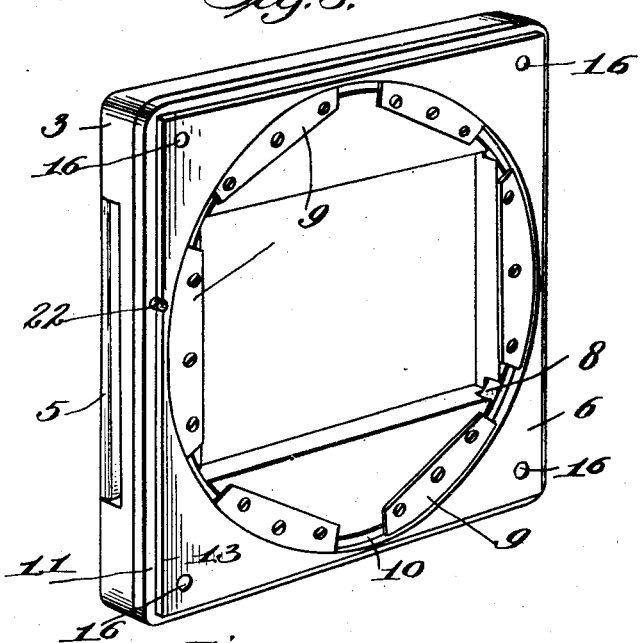
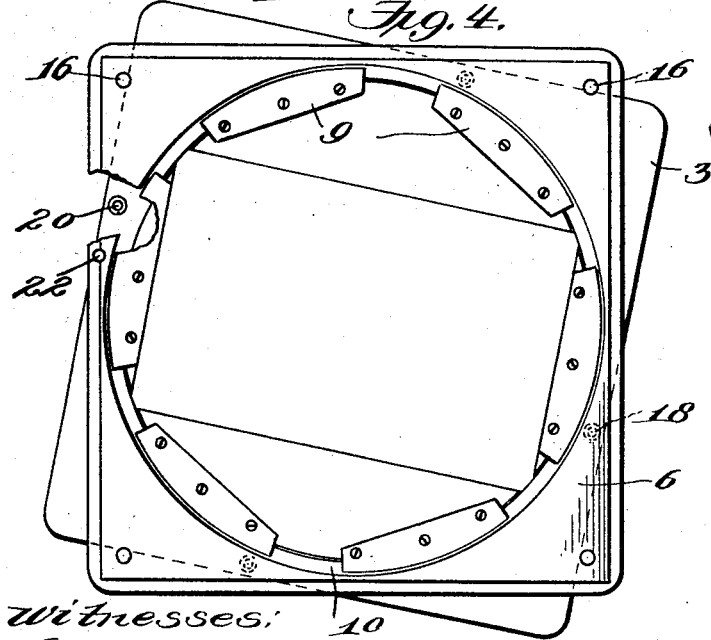
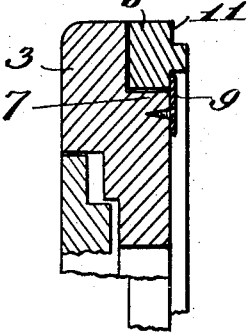

UNITED STATES PATENT OFFICE.

JOSEPH GODDARD, OF ROCHESTER, NEW YORK, ASSIGNOR TO SENECA CAMERA MANUFACTURING COMPANY, OF ROCHESTER, NEW YORK, A CORPORATION OF NEW YORK.

REVOLVING-BACK CAMERA.

1,001,386.     Specification of Letters Patent.     Patented Aug. 22, 1911.

Application filed November 29, 1910. Serial No. 594,733.

*To all whom it may concern:*

Be it known that I, JOSEPH GODDARD, a citizen of the United States, residing at Rochester, in the county of Monroe and State of New York, have invented new and useful Improvements in Revolving-Back Cameras, of which the following is a specification.

My present invention relates to improvements in photographic cameras, and it has for its object primarily to provide simple and improved means whereby the back or support for the usual oblong plate holder may be readily positioned for exposures with the longer dimension of the plate arranged either horizontally or vertically, such positioning of the plate holder being capable of accomplishment at will and without the necessity of removing the plate holder from the camera, the plate holder supporting back according to the present invention being permanently mounted by a simple connection so as to turn or rotate on a frame and such frame is formed separately from and fitted to the camera box and has devices whereby it may be detachably secured thereto.

To these and other ends, the invention consists in certain improvements, and combinations and arrangements of parts, all as will be hereinafter more fully described, the novel features being pointed out particularly in the claims at the end of the specification.

In the accompanying drawing: Figure 1 is a perspective view of a camera constructed in accordance with my present invention, the adjustable back and its attaching frame being shown disconnected with respect to the camera box; Fig. 2 represents a side elevation of the camera in closed condition with the back applied thereto, portions being shown in section to illustrate the rotatable connection between the back and its attaching frame, and also the means for detachably connecting the back-attaching frame to the camera box; Fig. 3 is a perspective view of the back and its attaching frame as viewed from its forward side; Fig. 4 is a front view of the detachable frame and the back, the latter being shown partially rotated with respect to the frame; and Fig. 5 represents an enlarged section through one edge of the frame and the back illustrating the connection or joint for permanently uniting these parts.

Similar parts are designated by the same reference characters in the several views.

In the accompanying drawing I have shown the preferred embodiment of my invention wherein—

1 designates the camera box which contains the usual bellows 2 and other elements which make up a camera of the folding or any other desired type.

The back 3 may be of any suitable construction, that shown in the present instance being of the well known or conventional form and it is adapted to receive and contain the holder for plates or other sensitized materials to be exposed. For this purpose, the back is formed with a recess 4 which coöperates with and positions the plate holder in the focal plane of the camera lens and the plate holder is held in position by the usual spring-pressed section 5. As is usual, the back is adapted to receive plate holders which contain plates of oblong form, that is to say, the length of the plates is greater than the width. In order to enable exposures of the plates to be made while the plates are arranged with their longer dimension either horizontally or vertically and without the inconvenience of removing the plate holder from the camera, the back 3 which carries the plate holder is capable of a rotary movement with respect to the camera box, such rotary movement taking place in a plane parallel to the focal plane of the camera lens.

According to the present invention the back 3 has a permanent rotary connection with an attaching frame 6 and this attaching frame is detachably connected to the camera box. As the frame 6 is interposed between the back and the camera box, it is completely covered except at its peripheral edges when the back is in one or another position for exposure of the plates. The rotary connection between the back and the frame 6 is preferably produced by forming the back with a circular disk-like portion 7 on its forward face and the frame 6 is formed with a circular opening 8 in which the disk-like section 7 of the back fits rotatably. The marginal portion of the back exteriorly of the disk-like section 7 has a flat and smooth engagement with the rear face of the frame 6 and the rear face of the disk-like section 7 of the back has a suitable number of segmental retaining plates 9 secured thereto adjacent to its circular edge, and these plates overlap and coöperate with a depressed circular channel 10 which is formed in the forward face of the frame 6. Screws or their equivalents may be used to secure the plates 9 in position and they may be readily applied during the assembling of the camera while the frame 6 is detached from the camera, and after all of these plates are applied, the back 3 and the frame 6 are permanently united and may be applied and removed as a unit with respect to the camera box.

Any suitable means may be provided for detachably connecting the frame 6 to the camera box. In the present instance the marginal edge of the frame 6 is provided with a surrounding rabbet, the wall 11 of the rabbet being adapted to fit against the rear edge 12 of the camera box, and the other wall 13 being adapted to fit snugly within the rear edge 12 of the camera box, the bellows-attaching frame 14 within the camera box being sunk so as to accommodate that portion of the frame 6 which enters within the rear edge 12 of the camera box. The construction just described is generally preferred as the forwardly extending wall 13 on the frame 6 formed by the rabbet serves not only to center the said frame with respect to the camera box, but an easily detachable connection is provided which prevents the entrance of light between these parts. Suitable devices are employed for detachably securing this frame 6 to the camera box. In the present instance the corners of the frame 6 are formed with countersinks 15 and these countersinks have central apertures 16 which extend through the frame. A screw 17 is adapted to coöperate with each corner of the frame 6 and thereby secure it to the camera box, the threaded portion of the screw coöperating with the bellows-attaching frame 14 which for this purpose is preferably fitted with a set of threaded bushings 18 and the head 19 of each screw is arranged to operate in the countersink 15, it being of such a shape as to enable it to be readily manipulated by the fingers and when in fastened position its head is flush or below the surface at the rear side of the frame 6 so that these screws will not interfere with the relative rotary motion between the frame 6 and the back 3 when the latter is being adjusted to position the plate as desired. When the back 3 is in one or another exposing position the devices which secure the frame 6 to the camera box are concealed. By partially rotating the back 3, however, in the manner for instance as shown in Fig. 1, these devices are exposed and can be manipulated for the purpose of applying or removing the back and the frame 6 as a unit with respect to the camera box.

Any suitable means may be provided for holding the back 3 in one or another exposing position. In the present instance the back is provided with a set of recesses 20 which preferably correspond in number to the number of possible exposing positions, and a spring-pressed plunger 21 is fitted in the camera box and extends through an aperture 22 in the frame 6 and may coöperate with the appropriate recess 20 when the back 3 is moved into one of the exposing positions. This spring-pressed plunger 21 is accessible for manipulation at the exterior of the camera, it having an exposed projection 23 by which the plunger may be retracted preparatory to a reversal of the position of the back.

I claim as my invention:

1. The combination of a camera box, a back formed separately therefrom and provided with means to receive a plate holder, a frame having means for rotatably connecting it to said back and having means coöperative with the camera box to form a light-tight connection therewith, and devices extending through the corners only of said frame and coöperative with the camera box to detachably connect said back and frame as a unit to the camera box, said devices being accessible for manipulation only when the back is in an inoperative position.

2. The combination of a camera box, a frame formed separately from and removably fitted to the rear thereof, a back having means for revolubly connecting it to the rear of said frame and also having means to receive a plate holder, and manually operative devices extending through the corners only of said frame and coöperative with the camera box to detachably secure said frame to the camera box, said devices being accessible for manipulation only when the back is in an inoperative position.

3. The combination of a camera box, a square back therefor having means to receive a plate holder, a square frame having means rotatably connecting it to the forward side of said back, and devices extending through the corners of said frame and coöperative with the camera box to detachably secure said frame thereto, such devices being accessible for manipulation only when said back is in an inoperative position.

4. The combination of a camera box provided with a plurality of attaching devices arranged in the corners only of said box, a frame formed separately from and applicable to the rear of the camera box, a back having means for permanently connecting it to revolve at the rear of said frame and also having means to receive a plate holder, and a set of attaching devices extending through the corners only of said frame and complemental to and coöperative with the attaching devices of the camera box to detachably connect the frame and back as a unit to the camera box.

5. The combination of a camera box, a frame adapted to fit the rear thereof and having a circular aperture and a surrounding circular channel, means for detachably securing said frame to the camera box, and a back applied to the rear of said frame and formed with a circular disk-like section which revolubly fits the circular aperture in the frame, the forward face of said disk-like section having retaining plates secured thereto which operate in said channel in the frame.

6. The combination of a camera box having a rectangular shape and provided in its corners with securing devices, a rectangular back adapted to receive a plate holder, a frame formed separately from and corresponding in shape to the camera box, means for rotatably connecting the back and frame, and a set of removable devices arranged in the corners of the frame and coöperative with said securing devices of the camera box for detachably securing the frame and back as a unit to the camera box.

7. The combination of a camera box having a rectangular shape and provided with suitable securing devices, a rectangular back having means to position a plate holder thereon, a rectangular frame formed separately from and corresponding in size and shape to the camera box, means for rotatably connecting the back and frame as a unit, and a set of attaching devices extending through the corners of said frame and coöperative with the said securing devices of the camera box to detachably connect the frame and back as a unit thereto, said devices being covered by the corners of the back when the latter is in operative position and being exposed when said back is turned into an inoperative position.

In testimony whereof I have hereunto set my hand in presence of two subscribing witnesses.

JOSEPH GODDARD.

Witnesses:
  EFFIE M. GODDARD,
  HARRY E. SEARLES.

---

Copies of this patent may be obtained for five cents each, by addressing the "Commissioner of Patents, Washington, D. C."